(12) United States Patent
Cornett et al.

(10) Patent No.: US 8,714,565 B1
(45) Date of Patent: May 6, 2014

(54) SEAL

(75) Inventors: Kenneth W. Cornett, Ivoryton, CT (US); Stephen S. Stone, East Haven, CT (US)

(73) Assignee: Parker-Hannifim Corporation, Cleveland, OH (US)

( * ) Notice: Subject to any disclaimer, the term of this patent is extended or adjusted under 35 U.S.C. 154(b) by 90 days.

(21) Appl. No.: 12/689,645

(22) Filed: Jan. 19, 2010

Related U.S. Application Data

(63) Continuation of application No. 11/339,914, filed on Jan. 25, 2006, now abandoned.

(60) Provisional application No. 60/648,017, filed on Jan. 27, 2005.

(51) Int. Cl.
*F16J 15/02* (2006.01)

(52) U.S. Cl.
USPC ........................................................... 277/644

(58) Field of Classification Search
USPC .................. 277/564, 566, 567, 644, 647, 603
See application file for complete search history.

(56) References Cited

U.S. PATENT DOCUMENTS

| | | | |
|---|---|---|---|
| 3,482,302 A * | 12/1969 | Williams ..................... 228/173.6 |
| 3,626,770 A * | 12/1971 | Lindburg ...................... 277/320 |
| 3,761,102 A | 9/1973 | Nicholson | |
| 4,173,252 A * | 11/1979 | Sakaki et al. ...................... 165/9 |
| 4,537,024 A | 8/1985 | Grosjean | |
| 4,602,795 A | 7/1986 | Lillibridge | |
| 5,094,290 A | 3/1992 | Buckreus | |
| 5,125,796 A | 6/1992 | Cromer | |
| 5,240,263 A * | 8/1993 | Nicholson ..................... 277/614 |
| 5,975,844 A | 11/1999 | Milazar et al. | |
| 6,193,240 B1 | 2/2001 | Johnson et al. | |
| 6,203,025 B1 | 3/2001 | Hayton | |
| 6,450,762 B1 | 9/2002 | Munshi | |
| 7,040,857 B2 * | 5/2006 | Chiu et al. ......................... 415/1 |
| 7,090,224 B2 | 8/2006 | Iguchi et al. | |
| 7,115,317 B2 | 10/2006 | Zhuo et al. | |
| 7,152,864 B2 | 12/2006 | Amos et al. | |
| 7,451,989 B1 | 11/2008 | Cornett et al. | |
| 7,530,574 B2 * | 5/2009 | Lah ............................... 277/314 |
| 7,857,579 B2 * | 12/2010 | Johnson Campino et al. ............................. 415/110 |
| 2005/0232764 A1 | 10/2005 | Chiu et al. | |
| 2006/0255549 A1 | 11/2006 | Amos et al. | |

FOREIGN PATENT DOCUMENTS

GB    2303888 A    3/1997

* cited by examiner

*Primary Examiner* — Vishal Patel
*Assistant Examiner* — Stacy Warren
(74) *Attorney, Agent, or Firm* — Bachman & LaPointe, P.C.

(57) ABSTRACT

A seal has a first endplate and has a second endplate. A first bellow spring spans first lateral portions of the first and second endplates. A second bellow spring spans second lateral portions of the first and second endplates.

14 Claims, 5 Drawing Sheets

SEAL

CROSS-REFERENCE TO RELATED APPLICATIONS

This is a continuation application of Ser. No. 11/339,914, filed Jan. 25, 2006, and entitled "Seal", which claims the benefit of U.S. Patent Application Ser. No. 60/648,017, filed Jan. 27, 2005, and entitled "Seal", the disclosures of which are incorporated by reference herein in their entirety as if set forth at length.

BACKGROUND OF THE INVENTION

The invention relates to seals. More particularly, the invention relates to metallic seals for high temperature applications.

SUMMARY OF THE INVENTION

One aspect of the invention involves a seal having a first endplate and having a second endplate. A first bellows spring (i.e., a spring element having a bellows like cross-section transverse to a longitudinal direction) spans first lateral portions of the first and second endplates. A second bellows spring spans second lateral portions of the first and second endplates (e.g., laterally opposite the respective first portions of the first and second endplates). The springs may be welded to the first and second endplates, the first and second bellows like spring elements biasing the first and second endplates apart when the seal is placed under compression. One or both of the endplates may be longitudinally segmented. One or both of the springs may be longitudinally segmented and may have apertures reducing an effective spring constant. The seal may consist essentially of the first and second endplates and the first and second spring elements. In cross-section, the first and second endplates may consist essentially of single pieces (thus accounting for the possible segmenting).

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
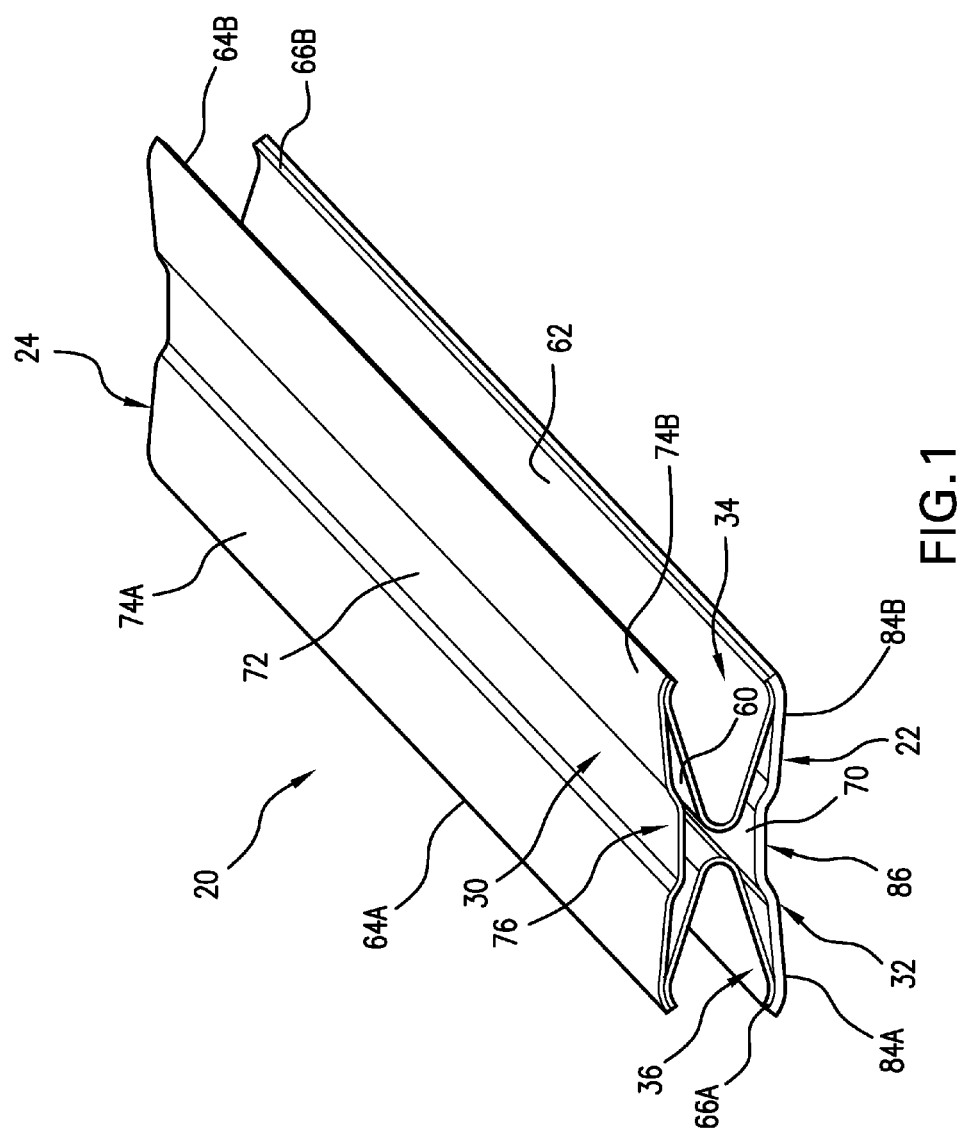
FIG. 1 is an isometric view of the exemplary embodiment of the seal.

FIG. 1 shows a seal 20 extending from a first end 22 to a second end 24. The seal comprises a pair of connector bands or endplates 30 and 32, and a pair of bellows-like spring elements 34 and 36, for biasing the endplates apart when the seal is placed under compression. In the exemplary embodiment, the bands and the springs are longitudinally coextensive (e.g., extending between parallel planes at the first and second ends 22 and 24). In the exemplary embodiment, both the first and second endplates 30 and 32 are continuous along the full length of the seal 20.

In the exemplary embodiment, the springs 34 and 36 are mirror images of each other across a longitudinal medial plane. Each of the springs is characterized by a bellows-like transverse cross section having one or more convolutions. The embodiment of FIG. 1 has a minimum extent of an outwardly-open C. An additional convolution would form an outwardly open E, etc. Each spring has a first, generally interior, surface 60 and a second, generally exterior, surface 62 both extending between first and second edges 64A; 64B and 66A; 66B. The endplates each have an interior surface 70 and an exterior surface 72. The first band 30 has edges approximately aligned with the first edges 64A; 64B of the respective springs and the second band 32 has edges respectively aligned with the second edges 66A; 66B of the springs. The bands and springs are welded to each other adjacent to such edges. Each endplate has a pair of sealing regions (surface portions) 74A; 74B and 84A; 84B aside a central recess 76 and 86.

Figure 2:
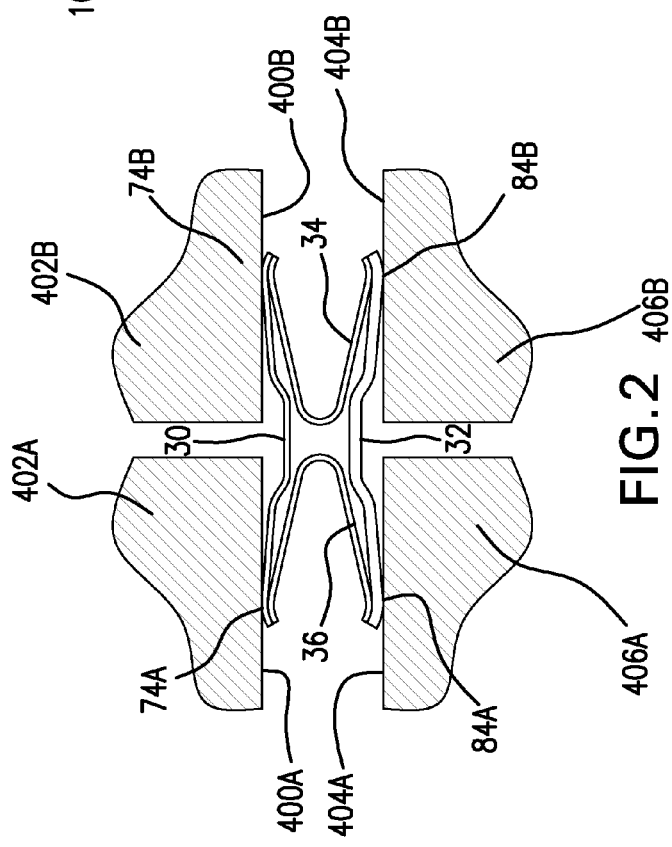
FIG. 2 is a sectional view of the seal of FIG. 1 mounted in a first environment.

In the exemplary embodiment, surfaces 74A; 74B and 84A; 84B contact and seal with surfaces of one or more environmental elements. For example, sealing surfaces 74A and 74B may seal with the same environmental element or two different environmental elements (e.g., surfaces 400A and 400B of elements 402A and 402B) of FIG. 2. Similarly, surfaces 84A and 84B may seal with surfaces 404A and 404B of one or more environmental elements 406A and 406B.

Figure 3:
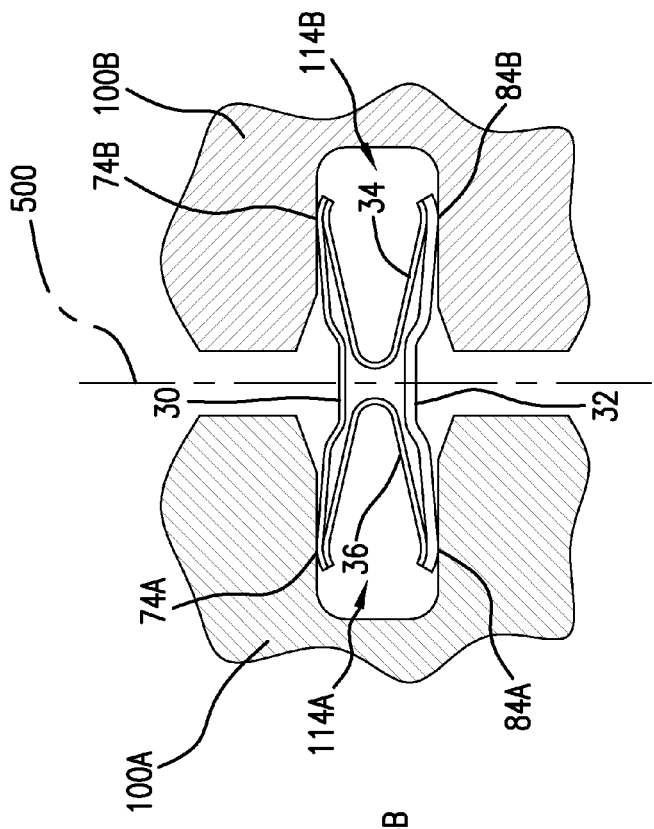
FIG. 3 is a sectional view of the seal of FIG. 1 mounted in a second environment.

Alternatively, the seal may be positioned to seal between two environmental elements 100A and 100B (FIG. 3), with opposing slots 114A and 114B. In the exemplary embodiment, the first slot 114A of one element is aligned with and facing the second slot 114B of the next, approximately symmetric across the seal longitudinal medial plane 500.

Figure 4:
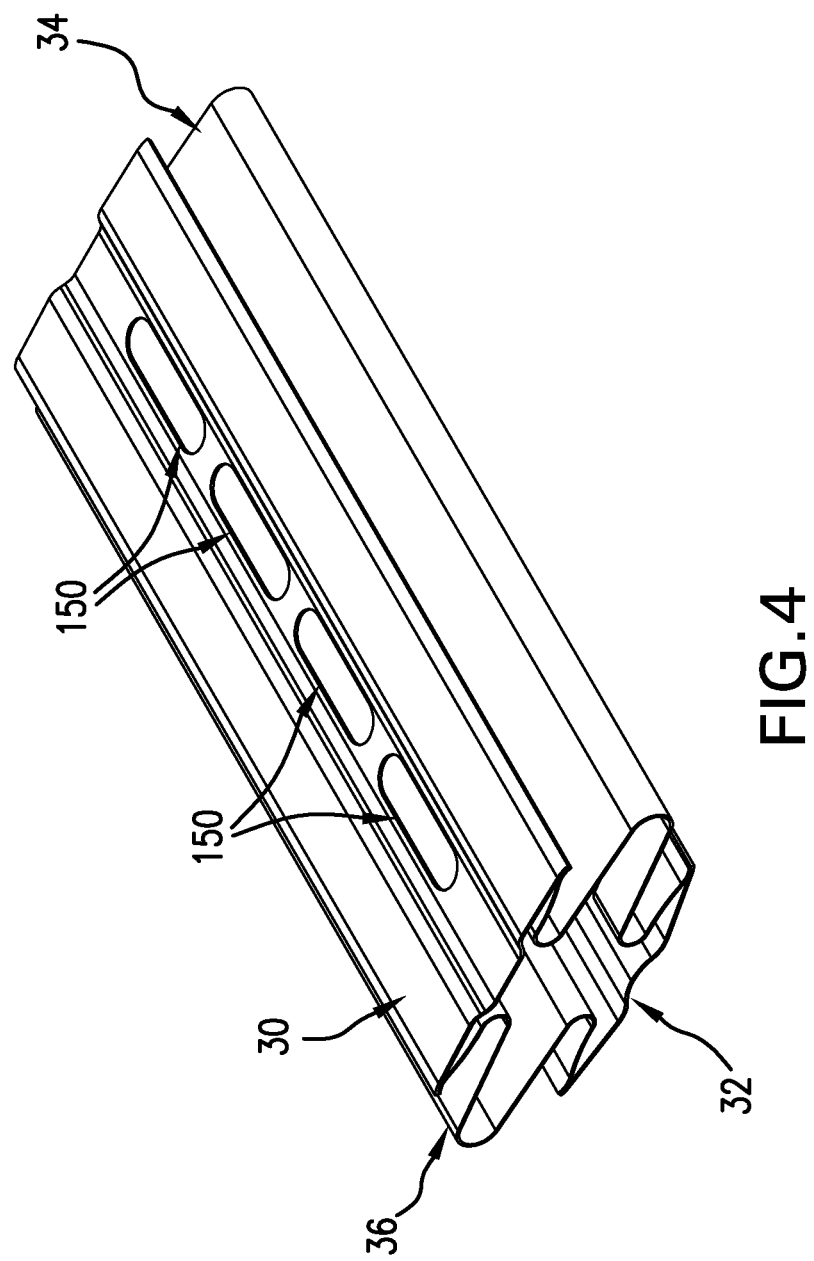
FIG. 4 is an isometric view of an alternate embodiment of the seal, with apertures provided in the endplates to provide cooling to the seal interior.
Figure 6:
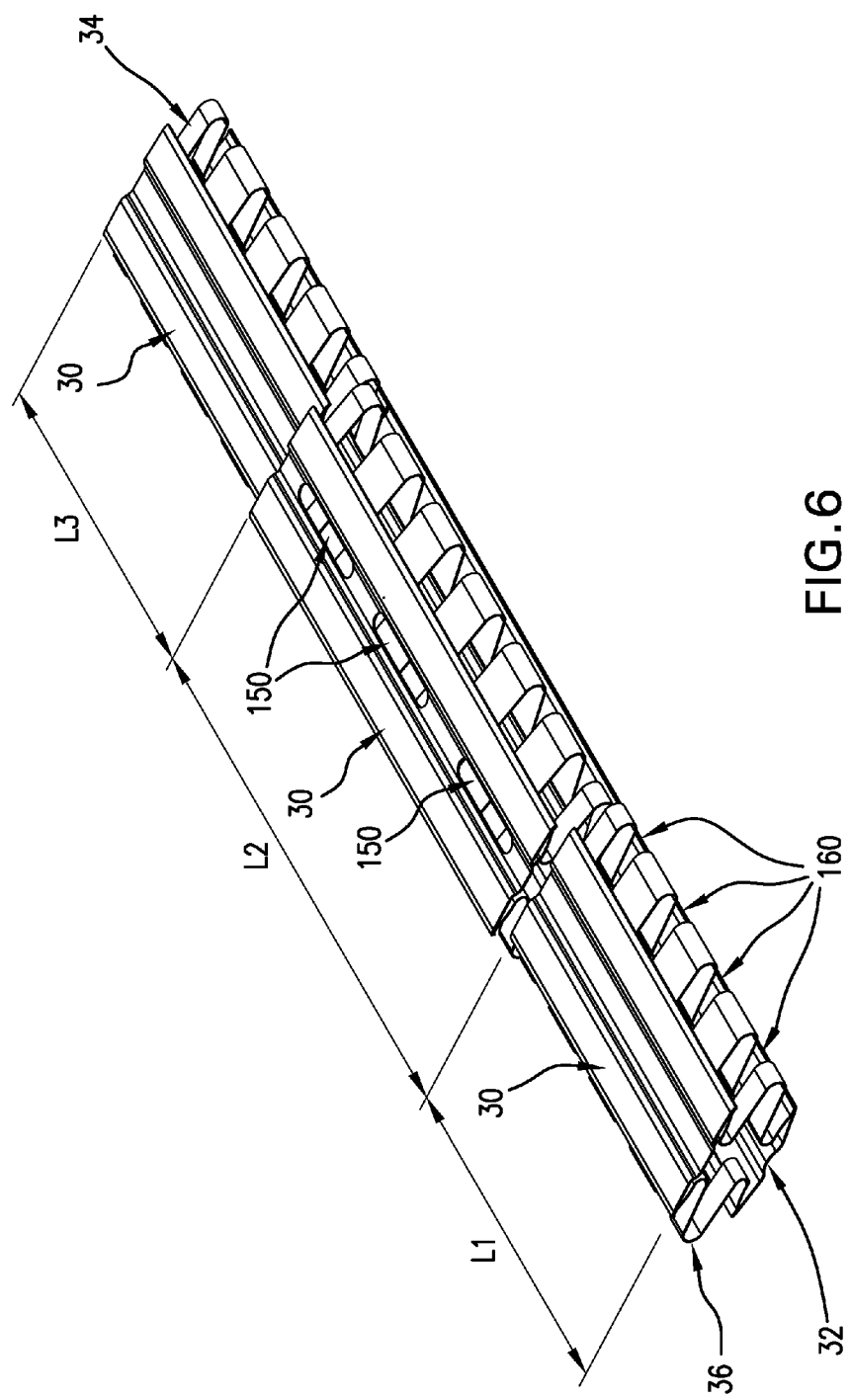
FIG. 6 is an isometric view of an alternate embodiment of the seal, with the upper endplate divided into three sections in order to allow locally increased compression of the seal.

The endplates 30 and 32 and/or the springs 34 and 36 may each be provided with vent apertures to provide a desired degree of venting and to keep the seal interior cool (especially in whichever endplate is oriented/positioned facing toward the cool side/zone). FIGS. 4 and 6 show exemplary apertures 150 in the relatively thin endplate 30. The endplate 32 is relatively thicker to withstand exposure to the hot side/zone.

Figure 5:
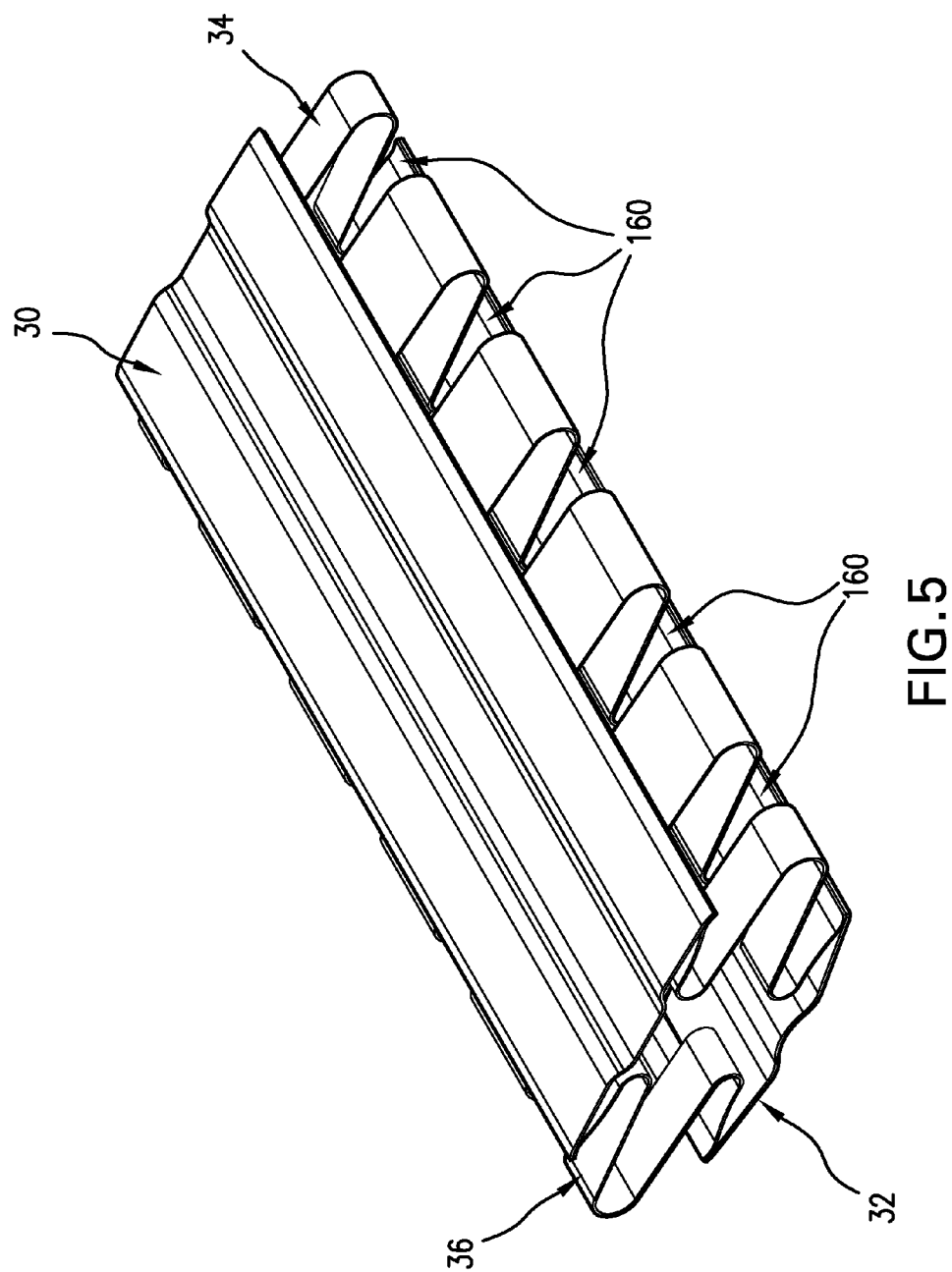
FIG. 5 is an isometric view of an alternate embodiment of the seal, with apertures provided in the spring elements to reduce the bias load of the seal.

Additionally, apertures may be provided in the springs to reduce the spring constant (and thus the bias force) of the seal, as shown in FIG. 5. In this embodiment, the apertures 160 are formed as rectangular slots having ends close to the spring edges. Thus they reduce the spring rate by essentially their fraction of the spring longitudinal span (e.g., an exemplary 30 to 70%). These apertures may extend the full length of the seal, or may be localized to one or more areas in order to optimize the performance of the seal for various environmental conditions.

The endplates and 30 and 32 may be longitudinally coextensive with one another and with the springs 34 and 36. Alternatively, one or both of the endplates may be segmented into two or more sections in order to allow locally increased compression of the seal. In FIG. 6, the endplate 30 is shown divided into three distinct sections L1, L2 and L3. These sections may be of equal or unequal length. Sections L1 and L2 are shown compressed to a greater extent than section L2. This may accommodate additional elements such as retention clips holding the elements being sealed or other elements.

Exemplary materials for the springs and endplates are one or more nickel-based or cobalt-based superalloys. The springs and endplates may be made of the same or different materials and different material thickness in order to optimize their performance for various environmental conditions. For example, one of the endplates exposed to a hotter or chemically more reactive environment may be of a more oxidation-resistant material and/or a material having greater high temperature strength (and/or may also be thicker). Similarly one of the endplates may be exposed to greater frictional and/or vibratory loads and may be of a stronger material (and/or may also be thicker). Cost may also suggest use of a less expensive material for the endplate subject to less heat, wear, etc. When of different thicknesses, exemplary characteristic thicknesses of the thicker endplate are 1.1-3.0 times that of the thinner. In an exemplary application for the seal, one endplate may be exposed to high-temperature combustion gases, while the other endplate is exposed to a cooling medium. In this application, the material type and thickness of the first endplate may be optimized to provide maximum resistance to oxidation, while the material type and thickness of the second endplate may be optimized for maximum wear resistance.

In an exemplary process for manufacture, the springs and endplates are blanked and roll-formed from sheet stock. The apertures 150 and 160 may be cut either before or after the roll forming. The first and second springs are then welded to the first and second endplates.

One or more of the embodiments of the present invention have been described. Nevertheless, it will be understood that various modifications may be made without departing from the spirit and scope of the invention. Accordingly, other embodiments are within the scope of the following claims.

What is claimed is:

1. A seal comprising:
   a longitudinally segmented first endplate;
   a second endplate; and
   a first bellows spring extending along and spanning longitudinally-extending first lateral portions of the first and second endplates; and
   a second bellows spring extending along and spanning longitudinally-extending second lateral portions of the first and second endplates, laterally opposite the respective first lateral portions of the first and second endplates, the first and second bellows springs biasing the first and second endplates apart when the seal is placed under compression.

2. The seal of claim 1 wherein:
   at least one of the first and second endplates includes a plurality of venting apertures; and
   the first and second springs include one or more slots effective to reduce their spring constants by at least 30%.

3. A method for manufacturing the seal of claim 2 comprising:
   forming the first and second endplates by:
      forming one or more first sheet metal strips;
      machining vent apertures into the first sheet metal strips; and
      shaping the first sheet metal strips;
   forming the first and second springs by:
      forming one or more second strips;
      cutting the slots; and
      shaping the second strips to bellows shapes; and
   welding the first and second springs to the first and second endplates.

4. The seal of claim 1 being a linear seal.

5. The seal of claim 1 wherein:
   the second endplate is unsegmented and longitudinally coextensive with the first endplate.

6. The seal of claim 1 wherein:
   the first and second endplates are welded to the first and second bellows springs.

7. The seal of claim 1 wherein:
   the first and second springs are formed of a nickel- or cobalt-based alloy.

8. The seal of claim 1 wherein:
   the first and second endplates are formed of a nickel- or cobalt-based alloy.

9. The seal of claim 8 wherein:
   the first and second endplates are formed of different materials from each other.

10. The seal of claim 8 wherein:
    the first and second endplates are formed of different characteristic thicknesses from each other.

11. The seal of claim 1 wherein:
    the first bellows spring and second bellows spring are minor images of each other across a longitudinal medial plane.

12. The seal of claim 1 wherein:
    the first and second endplates are respectively formed of first and second pieces; and
    the first and second springs are respectively formed of third and fourth pieces.

13. The seal of claim 1 consisting essentially of:
    the first and second endplates; and
    the first and second springs.

14. A method for manufacturing the seal of claim 1 comprising:
    forming the first and second endplates by:
       forming one or more first sheet metal strips; and
       shaping the first sheet metal strips;
    forming the first and second springs by:
       forming one or more second strips; and
       shaping the second strips to bellows shapes; and
    welding the first and second springs to the first and second endplates.

* * * * *